United States Patent
Wisch et al.

(10) Patent No.: US 8,368,244 B2
(45) Date of Patent: Feb. 5, 2013

(54) ENERGY BUFFER DEVICE FOR AN AIRCRAFT

(75) Inventors: Bodo Wisch, Bremen (DE); Lars Rowold, Varel (DE)

(73) Assignee: Airbus Deutschland GmbH, Hamburg (DE)

( * ) Notice: Subject to any disclaimer, the term of this patent is extended or adjusted under 35 U.S.C. 154(b) by 110 days.

(21) Appl. No.: 11/813,465

(22) PCT Filed: Jan. 18, 2006

(86) PCT No.: PCT/EP2006/000403
§ 371 (c)(1),
(2), (4) Date: Oct. 9, 2007

(87) PCT Pub. No.: WO2006/077088
PCT Pub. Date: Jul. 27, 2006

(65) Prior Publication Data
US 2008/0143186 A1    Jun. 19, 2008

Related U.S. Application Data

(60) Provisional application No. 60/644,914, filed on Jan. 19, 2005.

(30) Foreign Application Priority Data
Jan. 19, 2005  (DE) .................. 10 2005 002 545

(51) Int. Cl.
*H02J 7/34* (2006.01)
(52) U.S. Cl. ........................................... 307/9.1
(58) Field of Classification Search .......... 307/9.1, 307/10.1
See application file for complete search history.

(56) References Cited

U.S. PATENT DOCUMENTS

| | | | | |
|---|---|---|---|---|
| 4,536,693 A | * | 8/1985 | Marek | 320/166 |
| 4,660,787 A | | 4/1987 | Sprenger et al. | |
| 5,316,101 A | * | 5/1994 | Gannon | 180/221 |
| 5,456,529 A | * | 10/1995 | Cheung | 312/245 |
| 5,612,579 A | * | 3/1997 | Wisbey et al. | 307/18 |
| 5,769,654 A | * | 6/1998 | Onoda | 439/393 |

(Continued)

FOREIGN PATENT DOCUMENTS

| | | |
|---|---|---|
| DE | 10001038 A1 | 9/2001 |
| DE | 10305939 A1 | 8/2004 |

(Continued)

OTHER PUBLICATIONS

Rules of Electrical Equipment Installation (PUE) M. Ch. 1.3., 1998, Russian Office Action dated Nov. 19, 2009.

(Continued)

*Primary Examiner* — Adi Amrany
(74) *Attorney, Agent, or Firm* — Christopher Paradies; Fowler White Boggs P.A.

(57) ABSTRACT

An energy buffer device supplies energy to a consumer in an aircraft, and an electrical system for an aircraft. In one example, the device includes an energy feed device, an energy storage device and an energy supply device. The energy supply device may have line with a larger cross-sectional area than a corresponding line of the energy feed device. With the use of an energy buffer device, power may be switched on only for a short period of time. In addition, in case of a voltage breakdown in an on-board network, energy may be stored in an energy storage device. Supply of energy may thus occur over a short time at correspondingly high power, without placing a load on an on-board network or a generator.

9 Claims, 1 Drawing Sheet

U.S. PATENT DOCUMENTS

| | | | |
|---|---|---|---|
| 5,850,113 | A * | 12/1998 | Weimer et al. ............... 307/125 |
| 5,886,883 | A | 3/1999 | Rail |
| 5,914,542 | A * | 6/1999 | Weimer et al. ............... 307/125 |
| 5,917,249 | A * | 6/1999 | Kon'i et al. .................. 307/10.1 |
| 5,936,318 | A * | 8/1999 | Weiler et al. .................... 307/66 |
| 5,982,156 | A * | 11/1999 | Weimer et al. ............... 323/222 |
| 6,046,513 | A * | 4/2000 | Jouper et al. .................... 307/31 |
| 6,104,759 | A * | 8/2000 | Carkner et al. ............... 375/295 |
| 6,249,060 | B1 * | 6/2001 | Osha ........................... 307/10.1 |
| 6,384,491 | B1 | 5/2002 | O'Meara |
| 6,611,443 | B2 * | 8/2003 | Gaudreau ..................... 363/125 |
| 6,633,493 | B2 * | 10/2003 | Heinemann et al. ............ 363/15 |
| 6,650,087 | B2 * | 11/2003 | Yuasa et al. ................... 320/107 |
| 6,778,414 | B2 * | 8/2004 | Chang et al. ..................... 363/67 |
| 6,856,654 | B1 | 2/2005 | Carkner et al. ............... 375/295 |
| 6,981,671 | B1 * | 1/2006 | Baron et al. .................. 244/1 A |
| 7,085,112 | B2 * | 8/2006 | Wilk et al. ...................... 361/15 |
| 7,206,183 | B2 * | 4/2007 | Sikes et al. ................... 361/232 |
| 7,246,771 | B2 * | 7/2007 | Wisch et al. ............... 244/118.5 |
| 7,550,866 | B2 * | 6/2009 | Breit et al. ..................... 307/9.1 |
| 2002/0191418 | A1 * | 12/2002 | Clayton et al. .................. 363/17 |
| 2003/0026092 | A1 | 2/2003 | Reese et al. |
| 2003/0168913 | A1 * | 9/2003 | Kinnard .......................... 307/29 |
| 2004/0004462 | A1 | 1/2004 | Bean et al. |
| 2005/0211834 | A1 | 9/2005 | Wisch et al. |
| 2007/0145822 | A1 * | 6/2007 | Lopez et al. ................. 307/10.1 |
| 2007/0243425 | A1 * | 10/2007 | Spaner ............................ 429/12 |
| 2007/0297109 | A9 * | 12/2007 | Borrego Bel et al. ........... 361/62 |
| 2008/0150356 | A1 * | 6/2008 | Breit et al. ..................... 307/9.1 |

FOREIGN PATENT DOCUMENTS

| | | |
|---|---|---|
| DE | 10361830 A1 | 8/2005 |
| EP | 1026119 A1 | 8/2000 |
| JP | 59-118598 A | 7/1984 |

OTHER PUBLICATIONS

Military Standard, Aircraft Electric Power Characteristics, 31 pages.

M.A. Maldonado et al., Power Management and Distribution System for a More-Electric Aircraft (MADMEL) Program Status, IEEE AES Systems Magazine, Dec. 1999, 6 pages.

Joseph A. Weimer, Electrical Power Technology for the More Electric Aircraft, Aerospace Power Division, Aerospace Propulsion and Power Directorate, Wright Laboratory, Wright Patterson AFB, OH 45433-7658, 6 pages.

* cited by examiner

ENERGY BUFFER DEVICE FOR AN AIRCRAFT

RELATED APPLICATIONS

This application claims the benefit of the filing date of U.S. Provisional Patent Application No. 60/644,914 filed Jan. 19, 2005 and of the German Patent Application No. 10 2005 002 545.5 filed Jan. 19, 2005, the disclosures of which are hereby incorporated herein by reference.

FIELD OF THE INVENTION

The field relates to the energy supply in an aircraft. In particular, the field relates to an energy buffer device for supplying energy to consumers in an aircraft. Furthermore, the field relates to an electrical system for an aircraft, and the use of a power capacitor.

BACKGROUND

When dimensioning generators, current distributors and electrical lines in aircraft engineering, today dimensioning is predominantly according to the maximum current-power requirement of the connected electrical consumers. This means that generators for the supply of current to the aircraft, current distributors and electrical lines are dimensioned such that all electrical devices present on board can be supplied with the maximum current-power requirement, if need be concurrently.

In this arrangement, the sum of the total peak-current consumption is taken into account. For example, the current distribution network is dimensioned such that concurrent uptake of the peak current of the individual devices is provided for, although the probability of such concurrent uptake is low. As a result of this, disadvantageously, non-used overcapacity is taken into account in the planning of such electrical systems for aircraft, as a result of which the costs of producing an aircraft increase.

By way of intelligent control systems, according to a specified logic, consumers may be broken down into priority classes and may be switched on or off according to the generator loads at the time and the flight phases. For example, when loading or boarding an aircraft it is more important that the lighting of information signs or the drive of a lift device is switched on, than flight current required for operating automatic coffee machines or microwave ovens for heating meals for passengers, for example. While dividing these electrical devices into priority classes in dimensioning the current distribution systems makes it possible to work out the concurrent use of certain device classes, it does however not prevent dimensioning occurring on the basis of the peak-load requirement of the individual devices.

A great many electrical consumers are frequently only temporarily switched on, for example, lift drives for a trolley lift or the electrical lift drive for bins or hat-rack bins. The switch-on duration of such consumers often ranges from only a few seconds to a few minutes. If the allocation of such devices, for example, takes place by means of the above-mentioned priority classes, it may not be possible to activate a consumer when required, because its activation is not provided for in this particular flight phase.

SUMMARY OF THE INVENTION

It is one object to provide a capable and efficient energy supply in an aircraft.

According to one embodiment, the above-mentioned object may be met by means of an energy buffer device for the supply of energy to a consumer in an aircraft. The energy buffer device comprises at least one energy storage device, an energy feed device, an energy supply unit, wherein the energy storage device is designed to store a first energy in an electrical field. The energy feed device feeds the first energy to the energy storage device, and the energy supply device is designed to draw a second energy from the energy storage device and to feed the energy to the consumer. In this arrangement the energy supply device is designed for higher power than is the energy feed device.

Current peaks in the electrical system or in the on-board network may be avoided in this way. In this arrangement the design of the energy feed device and the energy supply device, where the design differs from the point of view of power, takes into account that the energy consumption and the storage of energy in the energy storage device can take place with less power than is for example the case with the energy supply. For example, the energy supply on board of an aircraft may be provided by way of generators.

If the energy storage device is an electrical storage device, then, with the same voltages, a low power input into the energy storage device means that little charging current is present. For little charging current, in one example, line systems for conveying the charging current may have a smaller cross section. In this manner, the weight of the aircraft may be reduced.

On the other hand, there may be a requirement for the power from the storage device to be temporarily high. For this purpose, the line system may be dimensioned so as to be correspondingly large with a large cross section. If the energy storage devices are positioned as near as possible to the consumers, the weight of the entire power lines may be reduced because only some of the lines have to have a large cross section.

Usually, connection of consumers is directly to the generators by way of correspondingly large-dimensioned lines. The lines are of correspondingly large dimensions in order to temporarily provide a high current corresponding to a high power. Consequently, the line system can become heavy. If energy storage devices are arranged in close proximity to consumers, it may take correspondingly longer time to load the energy storage devices with little current. In this wan the line systems may be dimensioned so as to correspond with the little current. However, when current is taken, correspondingly large currents are required in order to be able to transmit correspondingly high power by way of correspondingly large-dimensioned lines.

However, the lengths of the line sections that need to have large dimensions may be shortened by positioning the energy storage device in correspondingly close proximity to the consumer. In this wan the weight may be optimised based on a reduction in materials required for the lines.

Low power that is effective over an extended period of time may transmit the same energy as can high power that is effective over a short period of time. Electrical consumers are often switched on only for a short time. Examples of consumers that are only switched on for a short time are lift drives for trolley lifts or lift drives for bins or hat-racks.

In aircraft, hat racks are used for overhead baggage storage. In order to make these hat racks easier to operate, they may be operated with the use of electrical lift drives that operate like servomotors, thus making it easier for passengers to load or close the hat racks. The lift drives support a user of the hat rack in that they provide part of the force required for closing the bins. To provide this support, high power may be required for a short time.

As a rule, all the energy required for this may be taken from an energy storage device, without at first putting a load on the generator. The energy storage device may be charged by means of a generator before energy is drawn. Such charging may take place with little current over a correspondingly long period of time. In one example, the connected electrical consumer quasi may be operated without placing a load on the generator or on the on-board network.

The power is drawn from the energy storage device that is arranged so as to be decentralised and located in close proximity to the consumer. Drawing occurs quasi as "power on demand". After the operation of the consumer, for example the hat rack, as a rule there is sufficient time available to replenish the energy storage device with energy by means of the little current. Since during this time, only low maximum current consumption from the on-board network occurs exclusively for charging the energy storage device, voltage peaks or current peaks in the on-board network may be prevented. Operation of the electrical consumers may take place cyclically or sporadically; however, most of the time power requirements may be provided exclusively from the energy storage device.

Because the consumers are exclusively supplied with power from the energy storage system, simpler power management may be used in the aircraft, or the power management of the aircraft may be relieved because there is no need for any allocation of consumers, such as allocation to priority classes.

According to a further embodiment the second energy may be drawn independently in time from the supply of the first energy.

Independence in time of feeding or supplying energy makes it possible, when dimensioning the current system of an aircraft, to design the energy feed device for less power than is the case with the energy supply device. Due to the independence in time of feed and pickup, it is possible to take into account statistical parameters. In other words, this means that operation of a consumer, for example, has to occur for a short time with a peak power that is required for a short time, while thereafter there is an extended pause of non-use. This extended pause of non-use may be used to charge the energy storage device anew. The period of time available for charging the energy storage device is longer than that for discharging, so that the energy feed device has to be dimensioned for a smaller power requirement than is the case, for example, with the energy supply device.

According to a further embodiment, an energy buffer device is stated where the energy storage device has low electrical resistance.

Low electrical resistance may range from 0.001 to for example, 0.002 Ohm. For providing high power to a consumer it may be required for the energy storage device to provide a high current. If in this arrangement the energy storage device has high electrical resistance, then a large part of the stored energy is released to the electrical resistance.

An energy storage device with low electrical resistance makes it possible to provide high power to a consumer. In this way, it is possible in an efficient manner to draw low power that has been fed to the energy storage device over an extended period of time in a short period of time as a high service output with little dissipation power. The dissipation power, which with high resistance would be converted to heat, is thereby minimised. Conversion of the power and storage of the energy may thus occur with little loss.

Low internal resistance renders the energy storage device capable of handling high current and thus makes it possible to operate consumers with a high starting current/continuous current independently of the on-board network. In this way again, the maximum-required generator performance is reduced by the storage or buffering of the peak requirement.

According to a further embodiment, an energy buffer device may have an energy storage device that is a capacitor.

A capacitor may be associated with low service intensity. When compared to a battery or an accumulator battery, both of which have a short service life of approximately 1,000 charge cycles, a capacitor has approximately 500,000 charge cycles. A long service life means shorter downtimes as a result of service work. For example, capacitors do not have to be changed as frequently as do batteries or accumulator batteries.

Due to their small size, capacitors or power capacitors provide improved installation options when compared to accumulator batteries or batteries. Capacitors are very reliable and can therefore be used for important systems. Since capacitors have little self-discharge they are suitable as standby voltage sources, for example, for consumers with a short duration of operation. Capacitors may thus also be used in energy buffer devices in order to take over when the current supply to the on-board system is interrupted. For example, in this way it is possible despite generator failure to maintain the operation of on-board computers or of the on-board system, and likewise provide an uninterruptible power supply (UPS).

By expanding operability of the connected consumers in the case of failure of the power supply or voltage supply, safety on board an aircraft can be improved. Likewise, capacitors can also replace accumulator-battery-operated emergency power supply units (EPSUs) for various systems, for example emergency lighting in the cabin.

As a result of the light intrinsic weight of the capacitors or storage capacitors, even with local installation in close proximity to consumers, weight advantages may be achieved when compared for example with emergency power supply units. The light intrinsic weight of capacitors may allow additional weight savings in the design of aircraft.

According to a further embodiment, the energy buffer device may be designed to supply energy to the lift device of a hat-rack bin or of a trolley lift. Frequently, the lift drive for a trolley lift or the lift drive for bins is switched on only for a short time. The switch-on duration of such consumers often ranges only from a few seconds to a few minutes.

If such devices were to be connected directly to the generator of the on-board power supply, then their temporarily high peak load requirement would have to be taken into account in dimensioning the generator or the current system. However, depending on circumstances, the energy does not have to be available to all consumers at the same time. The use of an energy buffer device in one example invention, in particular of power capacitors, allows one to simplify or relieve the power management of the aircraft.

According to a further embodiment, an electrical system for an aircraft may allow to supply a consumer by means of an energy buffer device and in this way, prevent the occurrence of current peaks in the electrical system.

According to a further embodiment, the use of a power capacitor for buffering the energy in an aircraft is stated. A power capacitor has very little internal resistance so that it is capable of handling a high current. As a result of this, it may provide a relatively high current in a short period of time. As a result of the light intrinsic weight of a capacitor, power capacitor or storage capacitor, it is possible, even in the case of local installation, i.e. decentralised in close proximity to the consumer, it is possible to achieve weight advantages when compared to accumulator batteries, batteries or EPSUs. As a result of its low self-discharge, a capacitor may be used as a storage device or a buffer, for example, for a computer system. Likewise, due to the larger decoupling of the electrical consumers (for example, solenoid valves) based on the lighter intrinsic weight of capacitors, improvements in the area of EMC may also be achieved. Loads occur in decentralised locations between the consumer and the capacitor, while without the use of a capacitor all loads would act on the generator, as a result of which the EMC load would be increased.

BRIEF DESCRIPTION OF THE FIGURES

Below, exemplary embodiments are described with reference to the following figures.

In the following description of FIGS. 1 to 2, the same reference characters are used for identical or corresponding elements.

DETAILED DESCRIPTION

The examples described and drawings rendered are illustrative and are not to be read as limiting the scope of the invention as it is defined by the appended claims.

Figure 1:
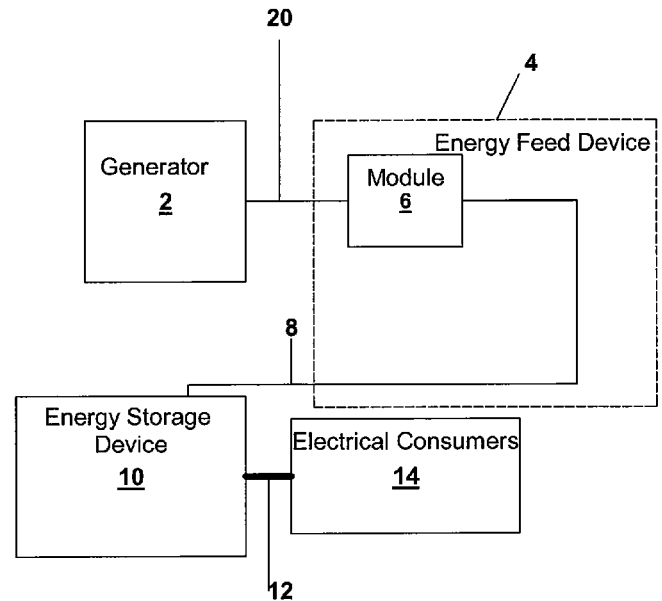
FIG. 1 shows a block diagram of an embodiment of an energy buffer device in one example.

FIG. 1 shows a block diagram of an embodiment of an electrical system for an aircraft. The Figure shows a generator 2 that supplies power to an electrical consumer 14. For a short period of time, high power 12 $P_{out}$ is to be supplied to the electrical consumer 14. In FIG. 1, this high power is indicated by a bold arrow 12. Corresponding to the high power 12 to be provided to the consumer 14, the associated energy supply unit is also to be designed to handle the increased power.

In one example, the electrical consumer 14, is a lift drive for a trolley lift or a lift drive for hat-rack bins. The hat-rack bins are, for example, overhead bins in the passenger compartment. To facilitate the stowing of baggage, the hat-rack bins may be lowered to approximately eye-level of passengers by means of a lift drive. After stowage of the baggage, the hat-rack bins are lifted so as to provide passengers with better overhead clearance. For the purpose of lifting the hat-rack bins, motors are attached to the lifting devices on the hat-rack bins, where the motors, in the manner of servomotors, reduce, or completely provide, the force required for closing the hat-rack bins. An individual lifting device can lift up to 60 kg.

This short-term lifting requires a corresponding force during the brief moment of lifting. In the case of an electromechanical transducer, this force corresponds to a high current or correspondingly high electrical power. The high power in turn may be drawn from the energy storage device 10 by way of the energy supply device 12. With a correspondingly high charge in the energy storage device 10 or correspondingly short lift duration and energy drawing time, all the energy or power required for lifting may be drawn from the energy storage device 10. This means that the generator 2 is at first not subjected to a load, or only slightly subjected to a load, as a result of the energy drawn.

After energy has been drawn from the energy storage device 10 the energy withdrawn needs to be replaced in the energy storage device 10. To this effect, energy is drawn from the generator 2 or from the on-board network. However, a longer period is available for drawing the energy. The period of time for charging the energy storage device 10 is longer than the period for drawing the energy from the energy storage device 10. It can thus happen, for example, that a power $P_{out}$ 12 of 200 W has to be drawn in a period of 10 seconds. To this effect, the energy storage device has to take up a capacitance of approximately 2000 Ws. The generator can provide this energy as a charging power $P_{charge}$ 8. For example, in this way, 2 Watts may be provided for a period of time of 1000 seconds in order to charge the energy storage device 10. The feed line system 8 or the energy feed device 4 may comprise correspondingly thin lines.

In FIG. 1, the energy feed device 4 comprises the charge-electronics module 6 which controls charging or the power that is fed to the energy storage device 10. In this arrangement, a power $P_{in}$ 20 is drawn from the generator. This $P_{in}$ 20 is provided to the energy storage device by the charge-electronics module 6 by way of the feed line 8 $P_{charge}$. The extent of the power supplied is controlled by the charge-electronics module 6 according to the charge state of the energy storage device 10.

A situation may thus be achieved where high output power $P_{out}$ 12 is provided to an electrical consumer 14 without the generator 2 having to provide correspondingly high power in a short period of time. In this way, the energy feed device 4 can be dimensioned for less power than is the case with the energy supply device 12.

The energy storage device 10 may be arranged in close proximity to the electrical consumer 14. In this way, an arrangement can be achieved in which the thick lines for the energy supply device 12 have to be provided only for a short distance.

Self-sufficient operation of electrical consumers that most of the time are only switched on for short periods of time can be maintained. Due to the buffer effect of the energy storage device 10, an arrangement as shown in FIG. 1 may be used for storing energy in the case of a voltage breakdown. If the electrical consumer 14 is for example a computer system, then computer operation can nevertheless be maintained in the case of a voltage breakdown, although the generator 2 is no longer in a position to provide energy.

The compact arrangement of the power capacitors and the modest control effort required for power capacitors make it possible to easily retrofit power capacitors to existing line networks. The exchange of any EPSUs or accumulator batteries can take place just as easily.

Figure 2:
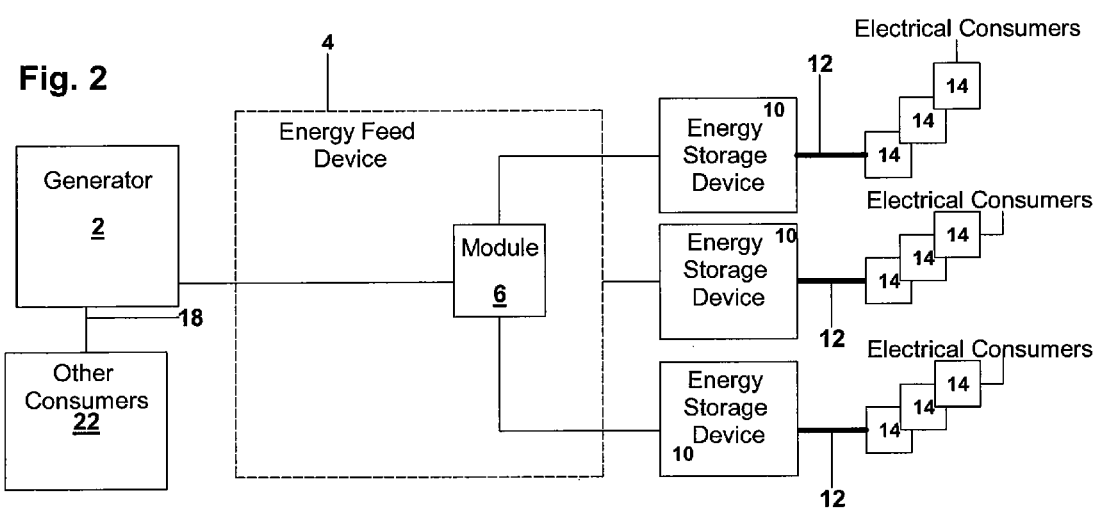
FIG. 2 shows the use of an energy buffer device according to one example in an electrical system for an aircraft.

FIG. 2 shows the use of an energy buffer device in an electrical system for an aircraft. FIG. 2 shows a feed line system or an energy feed device 4 that is designed to supply several electrical consumers 16. The diagram shows electrical consumers 16, in each case in groups of three. For example, the consumers 16 can be lift drives for hat-rack bins. In the case of the Airbus A 380, the use of 118 such lift drives is envisaged, in one example.

Each group of three hat rack bins is connected to an energy storage device 10 by way of the energy supply device 12. FIG. 2 shows that the energy storage devices 10 are situated in close proximity to the consumers 16. In this way, the energy supply device 12 may be kept correspondingly short. The energy supply device 12 is designed for high power, which is the reason why the lines of the energy supply device 12 have a correspondingly large line cross section. However, thick lines also mean an increase in material requirements or an increase in weight. For this reason, in order to reduce the overall weight of the electrical system in an aircraft, an attempt is made to use the smallest possible number of lines and to keep them short and thick.

The energy storage devices 10 are connected to the generator 2 by way of the energy feed device 4. The energy feed lines or the energy feed device 4 is correspondingly longer. However, the energy feed device 4 has to be optimised for lower power. In this way, the line cross-sections may be kept correspondingly small so that the weight of the line system is reduced.

Due to the buffer effect of the energy storage devices 10, during short-term operation of the consumers 16, the drawing of current does not directly place a load on the generator 2. Since the drawing of current occurs in correspondingly long time-intervals, the energy storage devices 10 may be charged at lower power over a longer period of time. Furthermore, power is not drawn by all consumers at the same time. Consequently the energy storage devices 10 are not all depleted at the same time. By means of buffering the energy by way of energy storage devices, power capacitors or power caps between the consumers 16 and the generator 2, improved distribution of the energy via the system may take place. The electrical system or the energy feed device 4 need not be designed to handle the entire potentially possible peak power load. Furthermore, the use of power capacitors or storage devices 10 may allow one to avoid switching off consumers in a targeted way in certain flight phases by means of a priority control system. For this reason, the consumers can be available during the entire duration of a flight.

The capacitors can be charged within an adequate period of time, for example, while the aircraft is in the parked position, and with little energy from the on-board network. Subsequently, the connected electrical consumers may be operated without placing a load on the on-board network, quasi as "power on demand". Operation of the power capacitors, which are capable of handling a high current and have little self-discharge, can occur in a quasi maintenance-free manner. Power capacitors may also replace accumulator batteries, batteries or EPSUs that are used for an emergency lighting arrangement in an aircraft, for example. Because power-capacitors are of lighter weight than are comparable accumulators or batteries, they can also contribute to weight reduction in an aircraft.

Apart from supplying power to the lift drives for the hatrack bins, the generator 2 or the on-board network 2 may also be used to supply energy to other consumers. In FIG. 2, this is indicated by the line 18 that is not designated in more detail.

In addition it should be pointed out that "comprising" does not exclude other elements or steps, and "a" or "one" does not exclude a plural number. Furthermore, it should be pointed out that characteristics or steps which have been described with reference to one of the above embodiments can also be used in combination with other characteristics or steps of other embodiments described above. Reference characters in the claims are not to be interpreted as limitations.

Alternative combinations and variation of the examples provided will become apparent based on this disclosure. It is not possible to provide specific examples for all of the many possible combinations and variations of the embodiments described, but such combinations and variations may be claims that eventually issue.

The invention claimed is:

1. An electrical system for a passenger aircraft, comprising:
    an energy storage device coupled to a charge-electronics module, the charge electronics module being coupled to a generator of electricity, the energy storage device being coupled to the charge-electronics module by an energy feed line system comprising a first cross sectional area and a first length;
    a consumer of electrical energy coupled with the energy storage device by an energy supply line system having a second cross sectional area and a second length;
    wherein the energy storage device is arranged between the consumer and the generator,
    wherein the energy storage device decouples the consumer, such that all the power required for the consumer is drawn from the energy storage device and operation of the consumer does not directly place a load on the generator;
    wherein the second cross sectional area is greater than the first cross sectional area and the second length is shorter than the first length; and
    wherein the storage device provides a common voltage both to the energy feed line system and to the energy supply line system; and
    the charge-electronics module controls the power that is fed to the energy storage device via the energy feed line system.

2. The electrical system of claim 1, wherein the energy storage device is designed such that energy provided to the consumer is capable of being drawn independently in time from the generator to the energy storage device for charging the energy storage device.

3. The electrical system of claim 1, wherein the energy storage device has low electrical resistance of 0.001 to 0.002 Ohms.

4. The electrical system of claim 1, wherein the energy storage device is a capacitor.

5. The electrical system of claim 1, wherein the energy feed line system and the energy supply line system are designed and arranged to take into consideration statistical parameters of electrical feed and pickup.

6. The electrical system of claim 1, wherein the supply line system connects a plurality of discrete lift drives to a single energy storage device isolated from the generator by the charge electronics module during operation of the plurality of discrete lift drives.

7. The electrical system of claim 1, further comprising at least one additional storage device, wherein the feed line system connects the energy storage device and the at least one additional storage device to the generator.

8. The electrical system of claim 7, wherein the feed line system comprises a junction, such that the energy storage device and the at least one additional storage device are coupled to the charge-electronics module and the charge-electronics module is coupled to the generator via a single line.

9. The electrical system of claim 1, wherein a plurality of discrete lift drives are connected by the supply line system and the supply line system comprises a fewest possible number of second lines for directing electrical energy to each of a plurality of discrete lift drives.

* * * * *